United States Patent
Kai et al.

(10) Patent No.: US 7,161,621 B2
(45) Date of Patent: Jan. 9, 2007

(54) IMAGE-CAPTURING DEVICE WITH POSITION DETECTOR FOR VIBRATION REDUCTION

(75) Inventors: Tadao Kai, Kawasaki (JP); Kazutoshi Usui, Kawasaki (JP)

(73) Assignee: Nikon Corporation, Tokyo (JP)

( * ) Notice: Subject to any disclaimer, the term of this patent is extended or adjusted under 35 U.S.C. 154(b) by 773 days.

(21) Appl. No.: 10/029,983

(22) Filed: Dec. 31, 2001

(65) Prior Publication Data

US 2002/0176713 A1    Nov. 28, 2002

(30) Foreign Application Priority Data

Jan. 9, 2001    (JP)    ............... 2001-001472

(51) Int. Cl.
    *H04N 5/228*    (2006.01)
(52) U.S. Cl. ............... 348/208.11; 348/208.2; 348/374; 250/239
(58) Field of Classification Search ............ None
    See application file for complete search history.

(56) References Cited

U.S. PATENT DOCUMENTS

| | | | |
|---|---|---|---|
| 5,335,091 A | * | 8/1994 | Palum ............... 358/474 |
| 5,831,671 A | * | 11/1998 | Chigira et al. ........... 348/208.8 |
| 5,850,575 A | * | 12/1998 | Ohishi ............... 396/52 |
| 5,852,749 A | * | 12/1998 | Konno et al. ........... 396/55 |
| 6,006,041 A | * | 12/1999 | Mizumaki et al. ........... 396/296 |
| 6,388,705 B1 | * | 5/2002 | Kawahara et al. ........ 348/208.99 |
| 6,562,887 B1 | * | 5/2003 | Kurasawa et al. ........... 524/269 |

FOREIGN PATENT DOCUMENTS

| | | | |
|---|---|---|---|
| JP | 7-248522 | | 9/1995 |
| JP | 07-248522 | * | 9/1995 |
| JP | 10-062831 | * | 6/1998 |

* cited by examiner

*Primary Examiner*—Ngoc-Yen Vu
*Assistant Examiner*—Hung H. Lam (57) ABSTRACT

An image-capturing device includes: an image-capturing element that converts light to an electrical signal; a photographic lens member that condenses subject light at the image-capturing element; a board on which the image-capturing element is mounted; and an elastic member having one end thereof secured to the photographic lens member and another end thereof secured to the board.

26 Claims, 11 Drawing Sheets

IMAGE-CAPTURING DEVICE WITH POSITION DETECTOR FOR VIBRATION REDUCTION

INCORPORATION BY REFERENCE

The disclosure of the following priority application is herein incorporated by reference: Japanese Patent Application No. 2001-001472 filed Jan. 4, 2001

BACKGROUND OF THE INVENTION

1. Field of the Invention

The present invention relates to an image-capturing device such as an electronic camera that employs a solid image-capturing element such as a CCD and, in particular, it relates to an image-capturing device achieving a vibration-proofing function for eliminating adverse effects of an unsteady hand movement and the like.

2. Description of the Related Art

Japanese Laid-Open Patent Publication No. H 7-248522 discloses an electronic camera achieving a so-called vibration-proofing function that prevents the quality of an image from becoming degraded due to the adverse effects of an unsteady hand movement by implementing shift-drive of a photographic lens element along the direction perpendicular to the optical axis of the photographic lens in order to cancel out the effect of the hand movement.

As we see increasing numbers of notebook-type personal computers and mobile telephones mounted with compact on-board cameras marketed in recent years, the demand for smaller, less expensive electronic cameras (electronic still cameras and video cameras) has intensified. Keeping pace with this demand, much effort is being put into making image-capturing elements smaller and to achieve further miniaturization of the photographic image plane. As a result, the focal length of a photographic lens for covering a given photographic field angle has become smaller, and a normal photographing operation can be performed through a so-called "pan focus" operation, which does not require the photographic lens to be moved along the direction in which the optical axis extends for focusing and allows it to be set at a specific fixed position.

The extent to which image quality degrades due to an unsteady hand movement or the like, which changes in proportion to the relationship between the photographic field angle and the angle of the hand movement, is not affected by the size of the photographic image plane if a photographing operation is performed at a fixed field angle. In other words, while the focusing function becomes unnecessary or at least less important in a normal photographing operation as the image-capturing element or the photographic image plane becomes smaller, vibration-proofing is still as necessary and effective a function as in a conventional camera with a larger image-capturing element and a larger photographic image plane. It is to be noted that while the need to achieve focus at the photographic lens is less rigorous in a camera having a smaller image-capturing element, defocusing occurs readily if the positional relationship between the image-capturing element and the photographic lens becomes offset along the direction in which the optical axis extends even by a slight degree and thus, more exacting requirements are imposed with regard to the positional accuracy along the optical axis.

In addition, the vibration-proofing mechanism itself must become smaller and lighter in conjunction with a miniaturized image-capturing element in order to achieve a more compact and lightweight photographing device.

A considerable difficulty exists in attempting to achieve the requirements imposed on electronic cameras in recent years, i.e., reduced size and weight, through the structure of the electronic camera with the conventional vibration-proofing function explained in reference to the related art which requires numerous components including the vibration-proofing drive mechanism (for shifting the lens, for instance) and a vibration detection sensor and thus does not facilitate the process of assembly either. Furthermore, since a complex structure is assumed in the electronic camera, it is difficult to maintain a satisfactory degree of accuracy with regard to the relative positions of the photographic lens and the image-capturing element along the optical axis.

SUMMARY OF THE INVENTION

An object of the present invention is to provide an image-capturing device achieving a high degree of positional accuracy between a photographic lens and an image-capturing element along the optical axis and having a compact, lightweight vibration-proofing drive mechanism.

In order to attain the above object, the first image-capturing device according to the present invention comprises: an image-capturing element that converts light to an electrical signal; a photographic lens member that condenses subject light at the image-capturing element; a board on which the image-capturing element is mounted; and an elastic member having one end thereof secured to the photographic lens member and another end thereof secured to the board.

In order to attain the second image-capturing device according to the present invention, it is preferred that the first image-capturing device further comprises: a drive device that moves the board and the photographic lens member relatively to each other along a direction substantially perpendicular to an optical axis of the photographic lens member.

In order to attain the third image-capturing device according to the present invention, in the second image-capturing device, it is preferred that the drive device moves the board and the photographic lens member relatively to each other along a direction substantially perpendicular to the optical axis of the photographic lens member by imparting an electromagnetic force. In this case, it is preferred that: the board is an electric circuit board; and the elastic member achieves electrical conductivity and at least part of the drive device and the electric circuit board are electrically connected via the elastic member. Furthermore, it is preferred that: the drive device comprises an electromagnet that moves as part of the photographic lens member and a permanent magnet secured to the board. Or, it is preferred that: the drive device comprises an electromagnet that moves as part of the photographic lens member and an electromagnet secured to the board.

In the above third image-capturing device, it is preferred that: the drive device comprises a permanent magnet that moves as part of the photographic lens member and an electromagnet secured to the board.

It is preferred that the above third image-capturing device further comprises: a vibration detection sensor secured to the board, which outputs an electrical signal corresponding to an extent of vibration of the image-capturing device; and a vibration-proofing control unit that implements drive control on the drive device in conformance to an output from the vibration detection sensor. In this case, it is preferred that: a position detection sensor secured to a board, which outputs an electrical signal corresponding to a position representing relative movement of the board and the photographic lens member, is provided; and the vibration-proofing control unit implements drive control on the drive device in conformance to outputs from the vibration detection sensor and the position detection sensor.

In the above first image-capturing device, it is preferred that: the elastic member is formed in a narrow, elongated rod shape and achieves elasticity along a direction perpendicular to a longitudinal direction thereof. In this case, it is preferred that: the elastic member is a metal wire.

In the above first image-capturing device, it is preferred that: the photographic lens member includes a photographic lens portion and a holding portion for holding the photographic lens. In this case, it is preferred that: the photographic lens and the holding portion are formed as an integrated unit through resin molding.

In the above first image-capturing device, it is preferred that: the photographic lens member and the elastic member are formed as an integrated unit through resin molding.

In the above second image-capturing device, it is preferred that: the photographic lens member is fixed relatively to a main body of the image-capturing device. Or, it is preferred that: the board is fixed relatively to a main body of the image-capturing device.

In the above first image-capturing device, it is preferred that: the elastic member regulates the distance between the image-capturing element and the photographic lens member.

The fourth image-capturing device according to the present invention comprises: an image-capturing element that converts light to an electrical signal; a photographic lens member that includes a photographic lens portion and a holding portion for holding the photographic lens and condenses subject light at the image-capturing element; a board on which the image-capturing element is mounted; an elastic member having one end thereof secured to the photographic lens member and another end thereof secured to the board; a drive device that moves the board and the photographic lens member relatively to each other along a direction substantially perpendicular to an optical axis of the photographic lens member; a vibration detection sensor secured to the board, which outputs an electrical signal corresponding to an extent of vibration of the image-capturing device; a position detection sensor secured to a board, which outputs an electrical signal corresponding to a position representing relative movement of the board and the photographic lens member; and a vibration-proofing control unit that implements drive control on the drive device in conformance to outputs from the vibration detection sensor and the position detection sensor.

DESCRIPTION OF THE PREFERRED EMBODIMENTS

Figure 1:
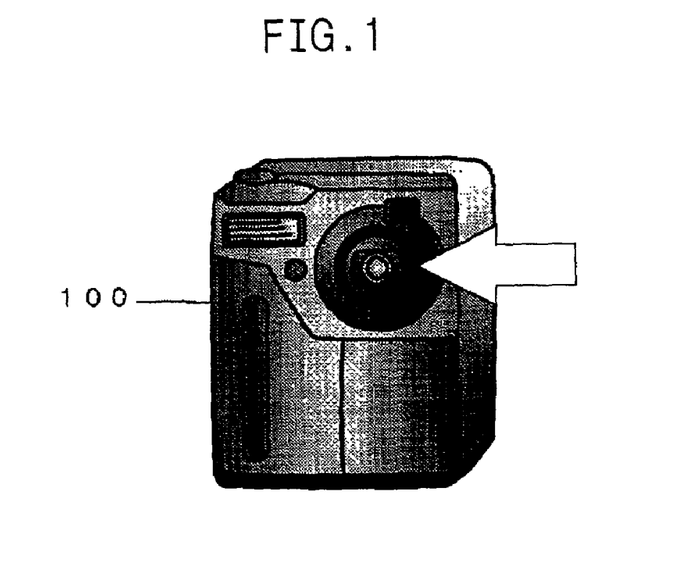
FIG. 1 presents an external view of the image-capturing device according to the present invention.

FIG. 1 presents an external view of the image-capturing device (a photographing device, an electronic camera) according to the present invention, which includes an image-capturing system comprising a photographic lens and an image-capturing element and a vibration-proofing mechanism for image-blur correction mounted in the space in a body 100 indicated by the arrow.

Figure 2:
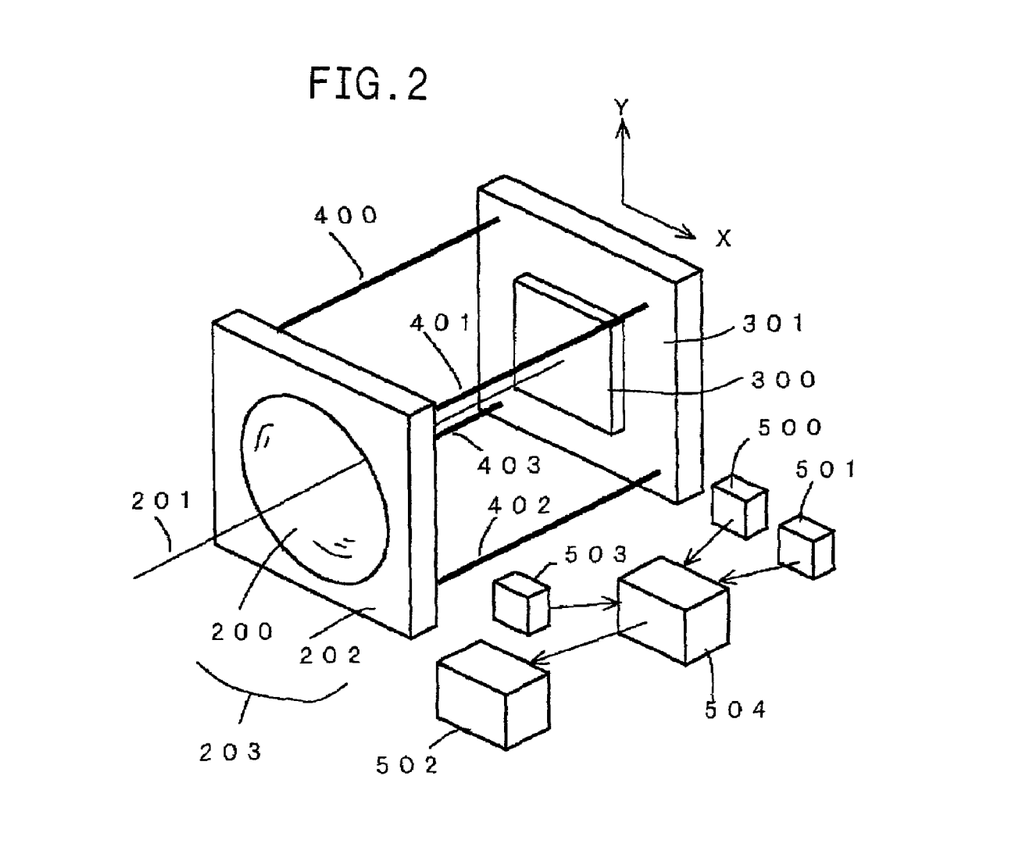
FIG. 2 shows the conceptual structures of the image-capturing system and the vibration-proofing mechanism in the image-capturing device according to the present invention.

In FIG. 2, showing the structures assumed in the image-capturing system and the vibration-proofing mechanism, the photographic lens 200 forms a subject image on the image-capturing element 300. The photographic lens 200 is held at a holding portion 202, and the photographic lens 200 and the holding portion 202 together constitute a photographic lens member 203. The image-capturing element 300 is mounted on a board 301. The board 301 may also function as an electric circuit board having the wiring pattern of the image-capturing element 300 formed thereupon. Elastic (flexible) members 400, 401, 402 and 403 are each formed in a narrow and elongated rod shape with one end thereof secured to the photographic lens member 203 and the other end thereof secured to the board 301, extending roughly parallel to an optical axis 201 of the photographic lens 200. The elastic members 400, 401, 402 and 403, which are each constituted of metal wire or the like, are capable of flexing along a direction perpendicular to the direction in which the wires extend, i.e., along the direction perpendicular to the optical axis.

As described above, the photographic lens member 203 and the board 301, which are elastically supported by the elastic members 400, 401, 402 and 403, are allowed to make a relative shift along the direction perpendicular to the optical axis 201. In addition, since only the elastic members 400, 401, 402 and 403 are present between the photographic lens member 203 and the board 301 mounted with the image-capturing element 300, it is possible to adjust the positional relationship between the photographic lens 200 and the image-capturing element 300 along the optical axis with a high degree of accuracy and also to reduce the extent of error occurring over time. Even when the elastic members 400, 401, 402 and 403 flex causing a relative shift of the photographic lens 200 and the image-capturing element 300 in the direction perpendicular to the optical axis, only a slight change occurs in the distance between the photographic lens member 200 and the image-capturing element 300 along the optical axis and thus, any adverse affect on the focus that may result can be disregarded as long as the extent of the shift is smaller than the length of the elastic members 400, 401, 402 and 403. It is to be noted that either the photographic lens member 203 or the board 301 is secured to the body 100 of the image-capturing device.

Vibration detection sensors 500 and 501, which respectively detect vibrations occurring around the Y axis and the X axis and output electrical signals indicating the extents of the detected vibrations may be constituted of angular speed sensors or the like in the known art. A shift-drive member 502 is utilized to implement shift-drive of either the photographic lens member 203 or the board 301 that is not secured to the body 100 perpendicular to the optical axis and achieves the drive by using an electromagnetic force or the like. For instance, it may be constituted by utilizing an electromagnetic actuator of the known art that includes a permanent magnet and an electromagnet (a conductive coil). A position detection sensor 503 is a sensor that detects the shift position of the member (the photographic lens member 203 or the board 301) having been driven and shifted by the shift-drive member 502 along the direction perpendicular to the optical axis and outputs an electrical signal corresponding to the detected shift position, and may be constituted of a position detection sensor having a PSD (position sensitive device), a slit and an LED, a position detection sensor having a photo-reflector and a gradation chart or the like of the known art. A vibration-proofing control unit 504 implements drive control on the shift-drive member 502 in conformance with the outputs from the vibration detection sensors 500 and 501 and the output from the position detection sensor 503 and prevents an image blur from occurring on the image-capturing element 300 by shifting the member (the photographic lens member 203 or the board 301) undergoing the shift-drive along the optical axis.

It is to be noted that further miniaturization of the vibration-proofing mechanism may be achieved by securing the vibration detection sensors 500 and 501, the shift-drive member 502 and the position detection sensor 503 to either the photographic lens member 203 or the board 301. In addition, by utilizing the metal wires constituting the elastic members also as the wiring between the photographic lens member 203 or the board 301 and the sensors and the shift-drive member when mounting these electrical components at the photographic lens member 203 or the board 301, even further miniaturization may be realized.

(First Embodiment)

Figure 3:
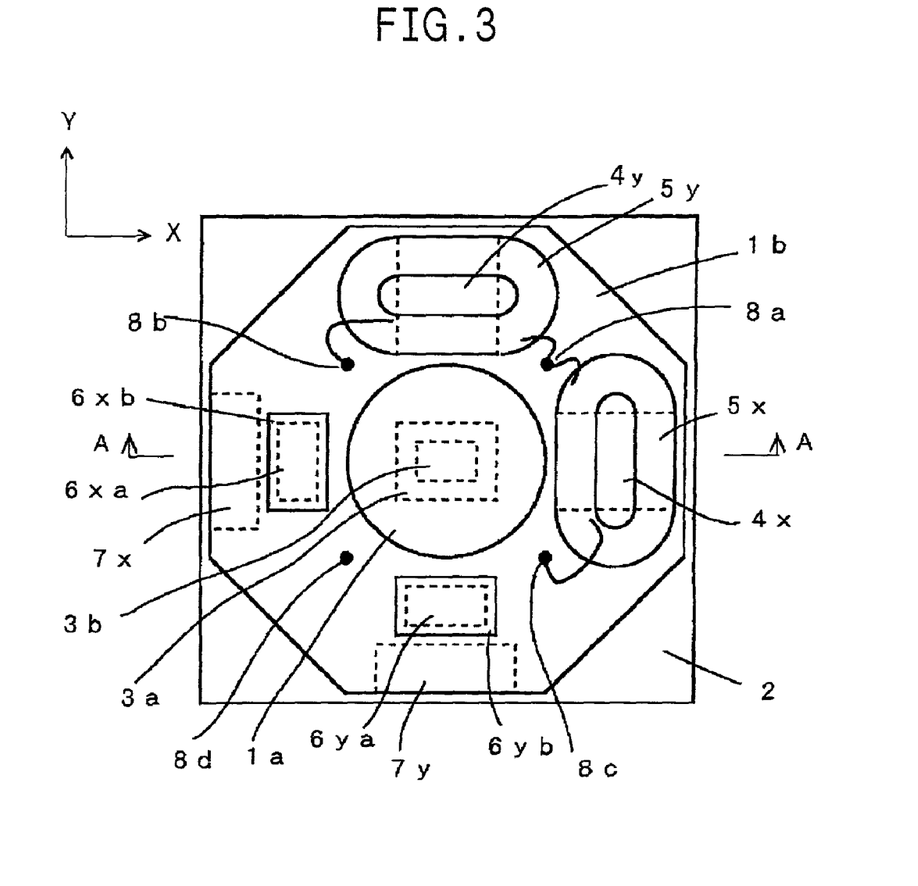
FIG. 3 presents a plan view of a first embodiment of the present invention.
Figure 4:
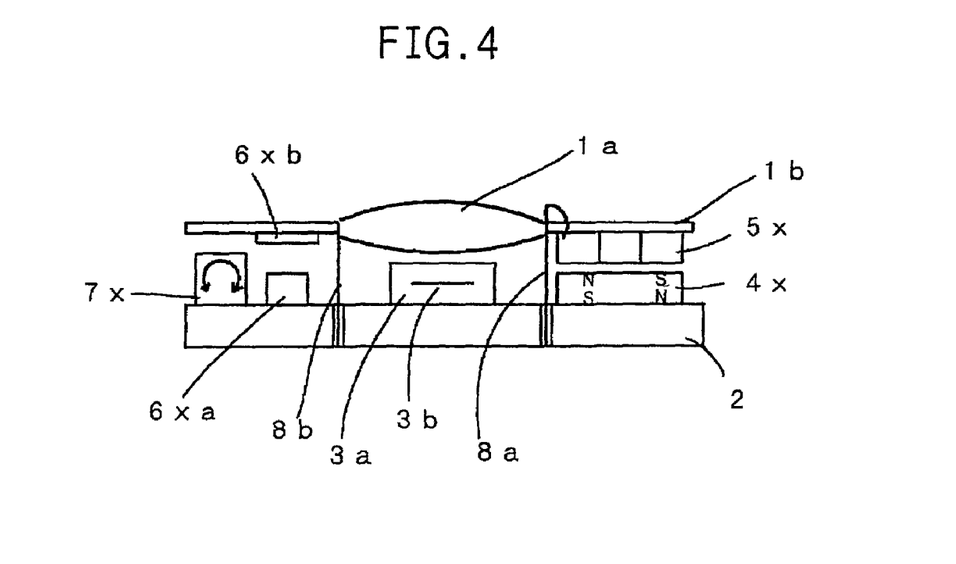
FIG. 4 presents a sectional view of the first embodiment of the present invention.

The following is an explanation of the first embodiment of the present invention, given in reference to the drawings. FIG. 3 is a plan view of the image-capturing device achieved in the first embodiment. FIG. 4 presents a sectional view through A—A in FIG. 3. It is to be noted that, for purposes of simplification, some of the background, which would be visible in reality, is omitted in the illustration presented in FIG. 4. In addition, components secured to a lens integrated member 1b are indicated with solid lines and components secured to a board 2 are indicated with broken lines in FIG. 3.

In FIGS. 3 and 4, reference numeral 1a indicates a photographic lens, reference numeral 1b indicates the lens integrated member provided as an integrated part of the photographic lens 1a and reference numeral 2 indicates the board (a printed board, a laminated printed board or the like) having electrical wiring work implemented thereupon. Reference numeral 3a indicates a CCD package and a reference numeral 3b indicates a CCD chip. It is to be noted that the board 2 is secured to the image-capturing device main body and thus, the photographic lens 1a and the lens integrated member 1b are shifted along the direction perpendicular to the optical axis for blur correction in the embodiment. In addition, while in the lens integrated member 1b is formed as an integrated part of the photographic lens 1a by using a transparent resin or the like, it may be formed as a lens holding member, which is independent of the photographic lens 1a, instead.

Reference numeral 4x indicates an X-direction drive magnet (permanent magnet) achieving in-plane, double-pole polarization, as shown in FIG. 4, which is secured to the board 2. Reference numeral 4y indicates a Y-direction drive magnet (permanent magnet) achieving in-plane, double-pole polarization, as does the X-direction drive magnet 4x, which is secured to the board 2.

Reference numeral 5x indicates an X-direction drive coil that is secured to the lens integrated member 1b through bonding or the like. Reference numeral 5y indicates a Y-direction drive coil that is secured to the lens integrated member 1b through bonding or the like, as is the X-direction drive coil 5x.

Reference numeral 6xa indicates an X-direction lens position detection photo-reflector, which is secured to the board 2 by such means as soldering the photo-reflector onto the printed wiring. Reference numeral 6xb indicates a gradation chart provided in conjunction with 6xa and secured to the lens integrated member 1b. The gradation chart 6xb is colored in varying gradations along the X-direction and the electrical signal output from the X-direction lens position detection photo-reflector 6xa changes in correspondence to the position of the gradation chart 6xb along the X-direction. As a result, the position of the lens integrated member 1b, i.e., the position of the photographic lens 1a, along the X-direction is ascertained.

Reference numeral 6ya indicates a Y-direction lens position detection photo-reflector, which is secured to the board 2 by such means as soldering the photo-reflector onto the printed wiring. Reference numeral 6yb indicates a gradation chart provided in conjunction with 6ya and secured to the lens integrated member 1b. The gradation chart 6yb is colored in varying gradations along the Y-direction and the electrical signal output from the Y-direction lens position detection photo-reflector 6ya changes in correspondence to the position of the gradation chart 6yb along the Y-direction. As a result, the position of the lens integrated member 1b, i.e., the position of the photographic lens 1a, along the Y-direction is ascertained.

Reference numeral 7x indicates a sensor for detecting the angular speed around the Y axis, and the Y-axis angular speed sensor 7x, which is secured to the board 2 by such means as soldering the sensor onto the printed wiring, detects a vibration (rotational angular speed) attributable to a rotation around the Y axis caused by an image blur along the X-direction in the image-capturing plane and outputs an electrical signal. Reference numeral $7y$ indicates a sensor for detecting the angular speed around the X axis, and the X-axis angular speed sensor $7y$ which is secured to the board 2 by such means as soldering the sensor onto the printed wiring, detects a vibration (rotational angular speed) attributable to a rotation around the X axis caused by an image blur along the Y-direction in the image-capturing plane and outputs an electrical signal.

Reference numeral $8a$ indicates a wire that supportably links the photographic lens $1a$ and the lens integrated member $1b$ to the board 2, which is constituted of an elastic material with a high degree of conductivity such as phosphor bronze. One end of the wire $8a$ is secured to the lens integrated member $1b$ (through bonding, soldering, insert molding or the like) and another end of the wire $8a$ is secured to the board 2 (by soldering the end at a through hole formed at the printed circuit board, for instance). The coil wirings of the X-direction drive coil $5x$ and the Y-direction drive coil $5y$ are each connected to the wire $8a$ at one end through a lead wire. The wire $8a$ functions as an electrical ground.

Reference numeral $8b$ indicates a wire that supportably links the photographic lens $1a$ and the lens integrated member $1b$ to the board 2, which is constituted of an elastic material with a high degree of conductivity such as phosphor bronze, as is the wire $8a$. One end of the wire $8b$ is secured to the lens integrated member $1b$ and another end of the wire $8b$ is secured to the board 2. One end of the coil wiring for the Y-direction drive coil $5y$ is connected to the wire $8b$ through a lead wire.

Reference numeral $8c$ indicates a wire that supportably links the photographic lens $1a$ and the lens integrated member $1b$ to the board 2 and is constituted of an elastic material with a high degree of conductivity such as phosphor bronze. One end of the wire $8c$ is secured to the lens integrated member $1b$ and another end of the wire $8c$ is secured to the board 2. One end of the coil wiring for the X-direction drive coil $5x$ is connected to the wire $8c$ through a lead wire.

Reference numeral $8d$ indicates a wire that supportably links the photographic lens $1a$ and the lens integrated member $1b$ to the board 2, which is constituted of an elastic material with a high degree of conductivity such as phosphor bronze, as is the wire $8a$. One end of the wire $8d$ is secured to the lens integrated member $1b$ and another end of the wire $8d$ is secured to the board 2. The wire $8d$ does not achieve electrical conduction with any other member.

By controlling the current supplied to the wires $8a$, $8b$ and $8c$, the magnetic fields created by the X-direction drive coil $5x$ and the Y-direction drive coil $5y$ and the magnetic fields created by the permanent magnets $4x$ and $4y$ are allowed to interact with each other (repulsion, attraction) and, as a result, the photographic lens $1a$ and the lens integrated member $1b$ are driven to become shifted along the X-direction and the Y-direction. It is to be noted that driver circuits (not shown) for driving the drive coils $5x$ and $5y$ are mounted at the printed circuit board 2 with the outputs of the driver circuits connected to the wires $8a$, $8b$ and $8c$.

The image-capturing device in the first embodiment of the present invention assuming the structure described above achieves the following features.

Since a simple vibration-proofing mechanism is achieved by supportably linking the photographic lens $1a$ and the lens integrated member $1b$ to the board 2 with the four wires $8a$, $8b$, $8c$ and $8d$, no middle member is present, unlike in the prior art, thereby achieving miniaturization and weight reduction for the vibration-proofing mechanism and achieving an improvement in the assemblability of the vibration-proofing mechanism. In addition, since the positions of the CCD chip $3b$ and the photographic lens $1a$ along the optical axis are determined simply in conformance to the lengths of the four wires $8a$, $8b$, $8c$ and $8d$ in this structure, errors do not accumulate during the assembly process, which makes it possible to improve the accuracy of the relative positions of the CCD chip $3b$ and the photographic lens $1a$ along the optical axis.

Since the four wires $8a$, $8b$, $8c$ and $8d$ are also utilized as conductor members for conducting electricity between the shift-drive coils $5x$ and $5y$ and the board 2, it is not necessary to provide a member dedicated to achieve wiring with the shift-drive coils $5x$ and $5y$ and, as a result, miniaturization and weight reduction are achieved for the vibration-proofing mechanism and the assemblability of the vibration-proofing mechanism is improved.

Since the shift-drive coils $5x$ and $5y$ are provided at the lens integrated member $1b$ to generate the shift-drive force, the space between the lens integrated member $1b$ and the printed circuit board 2 can be utilized efficiently, thereby achieving miniaturization of the vibration-proofing mechanism.

With the photo-reflectors $6xa$ and $6ya$ constituting the position detection members secured to the same surface of the printed circuit board 2 as other components such as the CCD package $3a$, the space available between the lens integrated member $1b$ and the printed circuit board 2 can be utilized efficiently, to allow miniaturization of the vibration-proofing mechanism and, at the same time, the photo-reflectors $6xa$ and $6ya$ can be electrically wired with ease and the components can be mounted more easily to greatly facilitate the assembly process.

With the drive magnets $4x$ and $4y$ secured to the same surface of the printed circuit board 2 as other components such as the CCD package $3a$, the space available between the lens integrated member $1b$ and the printed circuit board 2 can be utilized efficiently, to allow miniaturization of the vibration-proofing mechanism and, at the same time, the components can be mounted with greater ease to facilitate the assembly process.

With the angular speed sensors $7x$ and $7y$ secured to the same surface of the printed circuit board 2 as other components such as the CCD package $3a$, the space available between the lens integrated member $1b$ and the printed circuit board 2 can be utilized efficiently, to allow miniaturization of the vibration-proofing mechanism and, at the same time, the angular speed sensors $7x$ and $7y$ can be electrically wired with ease and the components can be mounted more easily, to greatly facilitate the assembly process. In addition, as the Y-axis angular speed sensor $7x$ and the X-axis angular speed sensor $7y$ are secured to the board 2 as is the CCD chip $3b$, without numerous members present in between, they are not readily subjected to extraneous vibration (noise) or the like and are allowed to detect vibrations with a high degree of accuracy.

(Second Embodiment)

Figure 5:
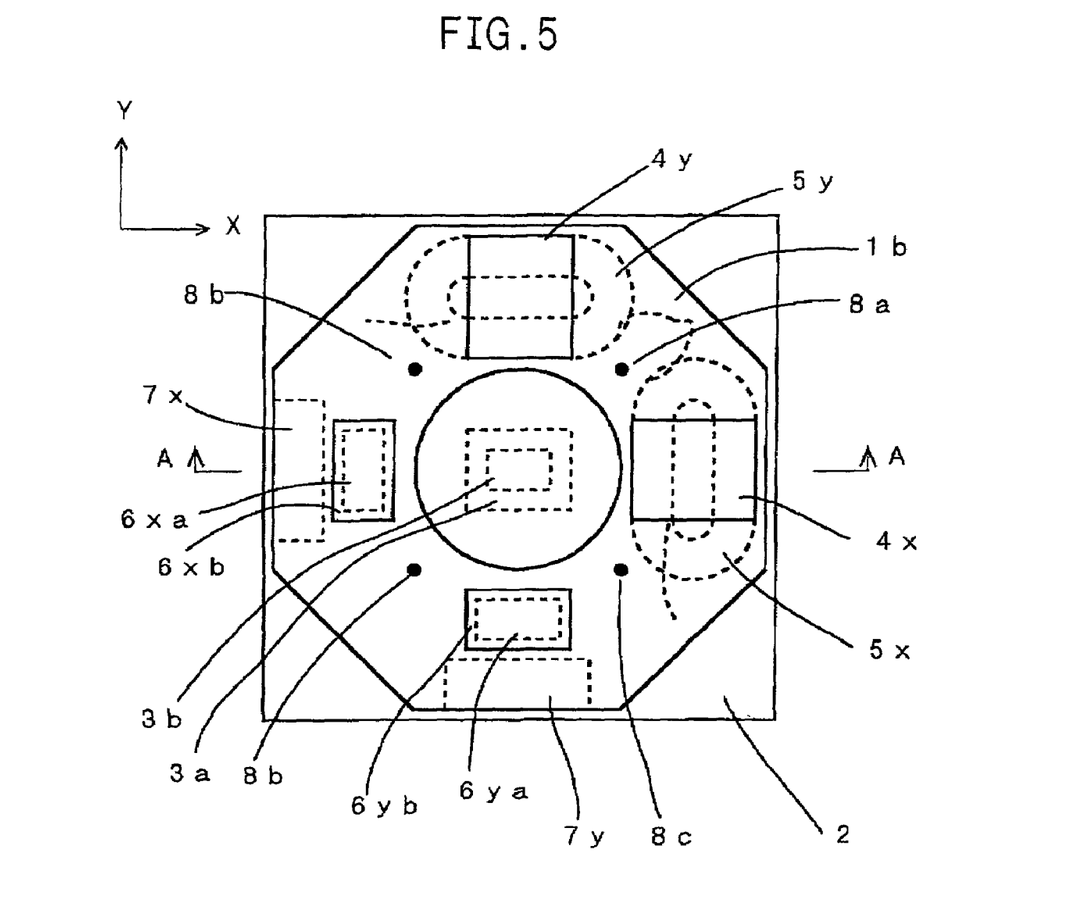
FIG. 5 presents a plan view of a second embodiment of the present invention.
Figure 6:
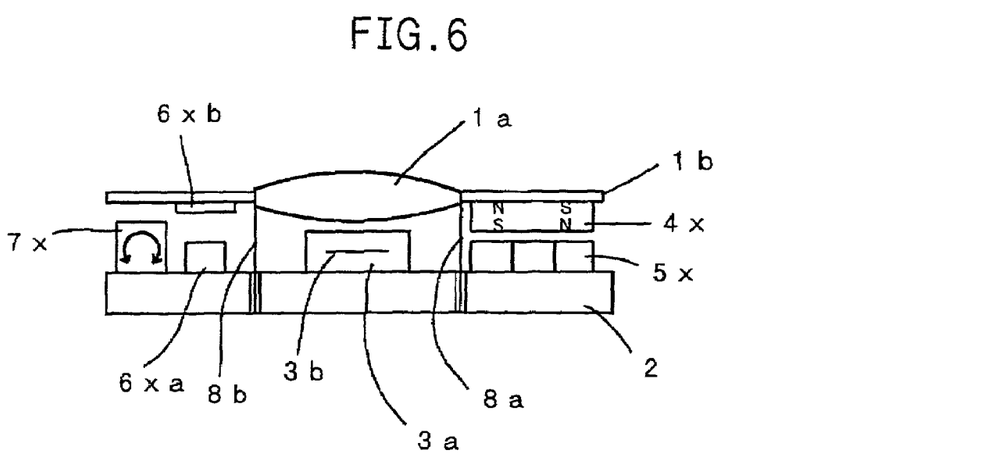
FIG. 6 presents a sectional view of the second embodiment of the present invention.

The following is an explanation of the second embodiment of the present invention, given in reference to the drawings. FIG. 5 is a plan view of the image-capturing device achieved in the second embodiment. FIG. 6 presents a sectional view through A—A in FIG. 5. It is to be noted that, for purposes of simplification, some of the background, which would be visible in reality, is omitted in the illustration presented in FIG. 6. In addition, components secured to the lens integrated member 1b are indicated with solid lines and components secured to the board 2 are indicated with broken lines in FIG. 5. It is to be noted that the same reference numerals are assigned to components in FIGS. 5 and 6 achieving functions identical to those in FIGS. 3 and 4 and an explanation of their functions is omitted.

In the second embodiment, the board 2 is secured to the image-capturing device main body and the photographic lens 1a and the lens integrated member 1b are shifted along the direction perpendicular to the optical axis for blur correction. The second embodiment illustrated in FIGS. 5 and 6 differs from the first embodiment in the positions assumed by the drive magnets 4x and 4y and the drive coils 5x and 5y in a reverse arrangement from that in the first embodiment, i.e., the drive magnets 4x and 4y are secured to the lens integrated member 1b and the drive coils 5x and 5y are secured to the board 2.

The image-capturing device in the second embodiment of the present invention assuming the structure described above achieves the following features in addition to the features of the first embodiment.

Since the drive coils 5x and 5y can be directly wired from the board 2, the electric wiring process is further facilitated.

Since it is not necessary to achieve electrical conduction in the wires 8a, 8b, 8c and 8d, they may be constituted of a material that is not electrically conductive or does not achieve good electrical conduction, such as a plastic resin. For instance, if they are constituted of a plastic resin instead of metal wires, they can flex more readily and, as a result, the reactive force imparted by the shifted wires 8a, 8b, 8c and 8d can be reduced. In addition, they may be formed with a resin as an integrated part of the lens integrated member 1b. Namely, by forming the photographic lens 1a, the lens integrated member 1b and the wires 8a, 8b, 8c and 8d as an integrated unit, a reduction in the number of required components is achieved and, at the same time, the assembly process is facilitated as well. It is to be noted that the wires 8a, 8b, 8c and 8d constituted of resin may be secured to the board through snap-shot, thermal caulking, screwing, bonding or the like.

Since the drive magnets 4x and 4y are provided on the side of the movable portion (the lens integrated member 1b) and the drive coils 5x and 5y are set and secured onto the surface of the printed circuit board 2 where the CCD package 3a and the like are also mounted, the space available between the lens integrated member 1b and the printed circuit board 2 can be utilized efficiently to achieve miniaturization of the vibration-proofing mechanism and, at the same time, the drive coils 5x and 5y can be electrically wired easily and the components can be mounted easily as well to greatly facilitate the assembly process.

(Third Embodiment)

Figure 7:
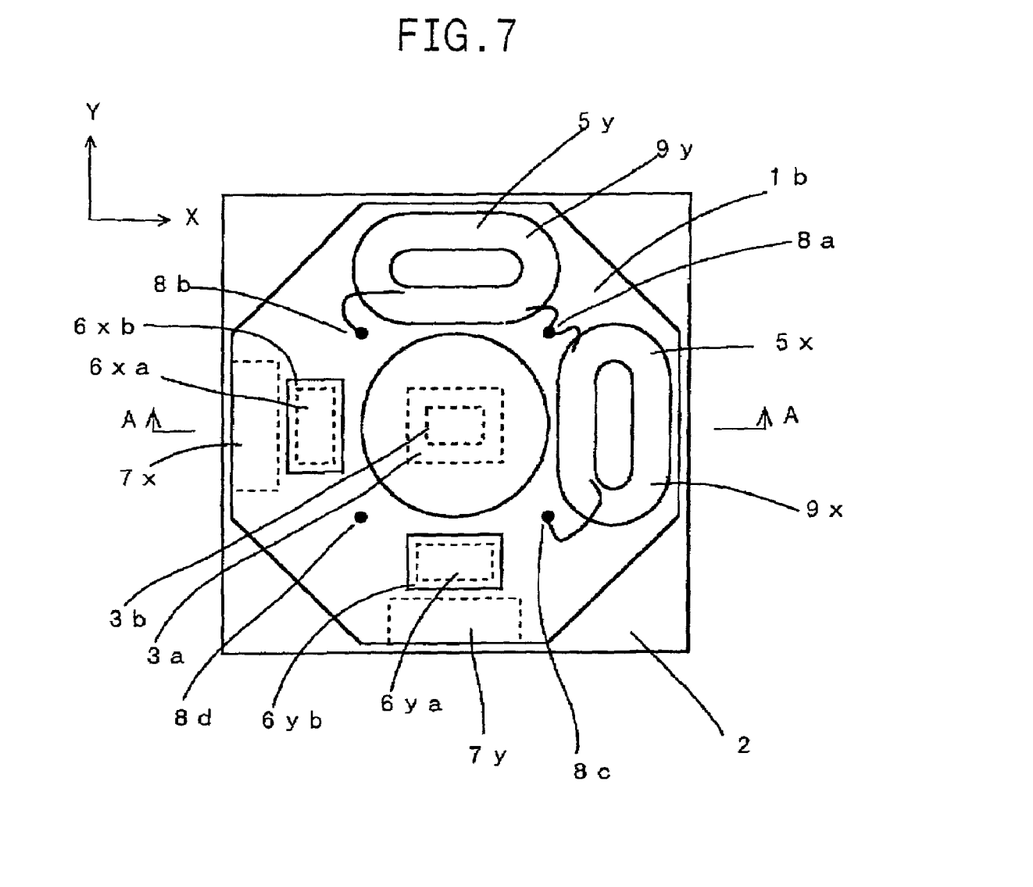
FIG. 7 presents a plan view of a third embodiment of the present invention.
Figure 8:
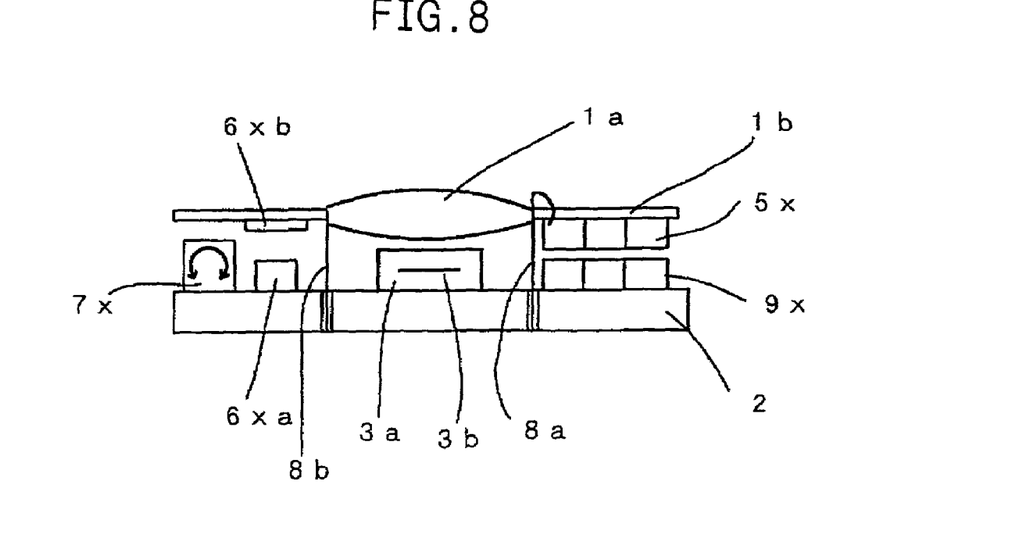
FIG. 8 presents a sectional view of the third embodiment of the present invention.

The following is an explanation of the third embodiment of the present invention, given in reference to the drawings. FIG. 7 is a plan view of the image-capturing device achieved in the third embodiment. FIG. 8 presents a sectional view through A—A in FIG. 7. It is to be noted that, for purposes of simplification, some of the background, which would be visible in reality, is omitted in the illustration presented in FIG. 8. In addition, components secured to the lens integrated member 1b are indicated with solid lines and components secured to the board 2 are indicated with broken lines in FIG. 7. It is to be noted that the same reference numerals are assigned to components in FIGS. 7 and 8 achieving functions identical to those in FIGS. 3 and 4 and an explanation of their functions is omitted.

In the third embodiment, the board 2 is secured to the image-capturing device main body and the photographic lens 1a and the lens integrated member 1b are shifted along the direction perpendicular to the optical axis for blur correction. The third embodiment illustrated in FIGS. 7 and 8 differs from the first embodiment in that the drive magnets 4x and 4y in the first embodiment are replaced by electromagnets (electromagnetic coils) 9x and 9y.

The image-capturing device in the third embodiment of the present invention assuming the structure described above achieves the following features in addition to the features of the first embodiment.

By constituting the coil portions of the electromagnetic coils 9x and 9y with light-weight members such as aluminum wires, a weight reduction is achieved over a structure that includes the magnets and, as a result, a more compact vibration-proofing mechanism is realized.

Since the electromagnetic coils 9x and 9y are secured onto the surface of the printed circuit board 2 where the CCD package 3a and the like are also mounted, the space available between the lens integrated member 1b and the printed circuit board 2 can be utilized efficiently to achieve miniaturization of the vibration-proofing mechanism and, at the same time, the electromagnetic coils 9x and 9y can be electrically wired easily and the components can be mounted easily as well to greatly facilitate the assembly process.

(Fourth Embodiment)

Figure 9:
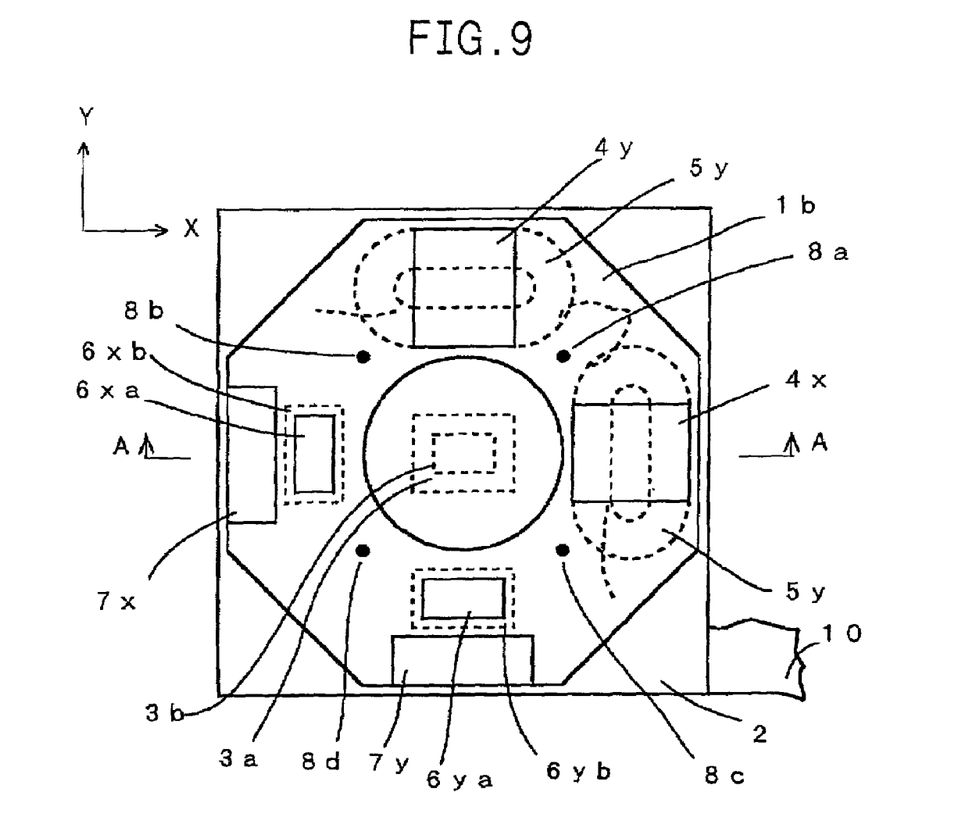
FIG. 9 presents a plan view of a fourth embodiment of the present invention.
Figure 10:
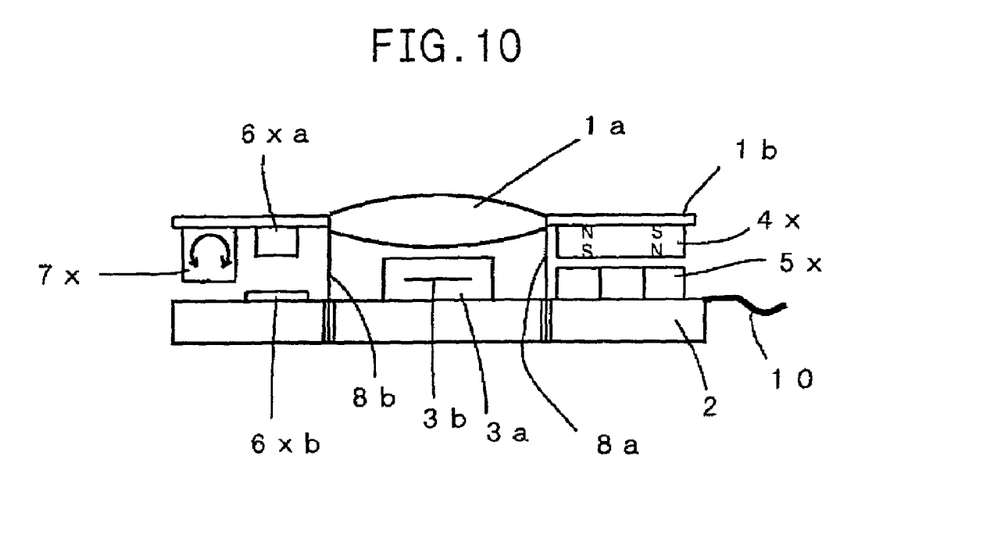
FIG. 10 presents a sectional view of the fourth embodiment of the present invention.

The following is an explanation of the fourth embodiment of the present invention, given in reference to the drawings. FIG. 9 is a plan view of the image-capturing device achieved in the fourth embodiment. FIG. 10 presents a sectional view through A—A in FIG. 9. It is to be noted that, for purposes of simplification, some of the background, which would be visible in reality, is omitted in the illustration presented in FIG. 10. In addition, components secured to the lens integrated member 1b are indicated with solid lines and components secured to the board 2 are indicated with broken lines in FIG. 9. It is to be noted that the same reference numerals are assigned to components in FIGS. 9 and 10 achieving functions identical to those in FIGS. 3 and 4 and an explanation of their functions is omitted.

In the fourth embodiment the photographic lens 1a and the lens integrated member 1b are secured to the image-capturing device main body and the board 2 is shifted along the direction perpendicular to the optical axis for blur correction. The fourth embodiment illustrated in FIGS. 9 and 10 differs from the second embodiment in that the positions assumed by the position detecting photo-reflectors 6xa and 6ya, the gradation charts 6xb and 6yb and the angular speed sensors 7x and 7y in a reverse arrangement from that assumed in the second embodiment, with the position detection photo-reflectors 6xa and 6ya and the angular speed sensors 7x and 7y secured to the lens integrated member 1b and the gradation charts 6xb and 6yb secured to the board 2. A power supply and a signal for the CCD chip 3b are connected to the printed circuit board 2 from the image-capturing device main body via a flexible printed circuit wiring 10.

The image-capturing device in the fourth embodiment of the present invention assuming the structure described above achieves the following features in addition to the features of the second embodiment.

Since the photographic lens 1a is fixed and the board 2 is shift-driven for image blur correction, it is possible to implement shift-drive on a relatively light-weight board 2 even when the weight of the photographic lens 1a constituted of a plurality of lenses increases. In addition, while the problem of deterioration in the image forming performance caused by a relative shift of a lens becomes an issue in a structure which includes a photographic lens constituted of a plurality of lenses and implements shift-drive on the lens closest to the CCD chip for blur correction, the problem of poor image forming performance does not occur as long as the image-capturing element is shifted as in the fourth embodiment.

In addition, as the Y-axis angular speed sensor 7*x* and the X-axis angular speed sensor 7*y* are secured to the lens integrated member 2 as is the photographic lens 1*a*, without numerous members present in between, they are not readily subjected to extraneous vibration (noise) or the like and are allowed to detect vibrations with a high degree of accuracy.

FIGS. 11–16 illustrate examples in which a unit achieved by linking the photographic lens 1*a* and the image-capturing element unit (the CCD package 3*a*, the CCD chip 3*b* and the board 2) via the wires 8*a*–8*d* as in the first–fourth embodiments of the present invention is adopted in image-capturing devices having various types of photographing optical systems. For simplification, other components (the drive magnets, the drive coils, the lens position detection sensors, the angular speed sensors and the like) required to enable the vibration-proofing operation are not shown in the drawings.

Figure 11:
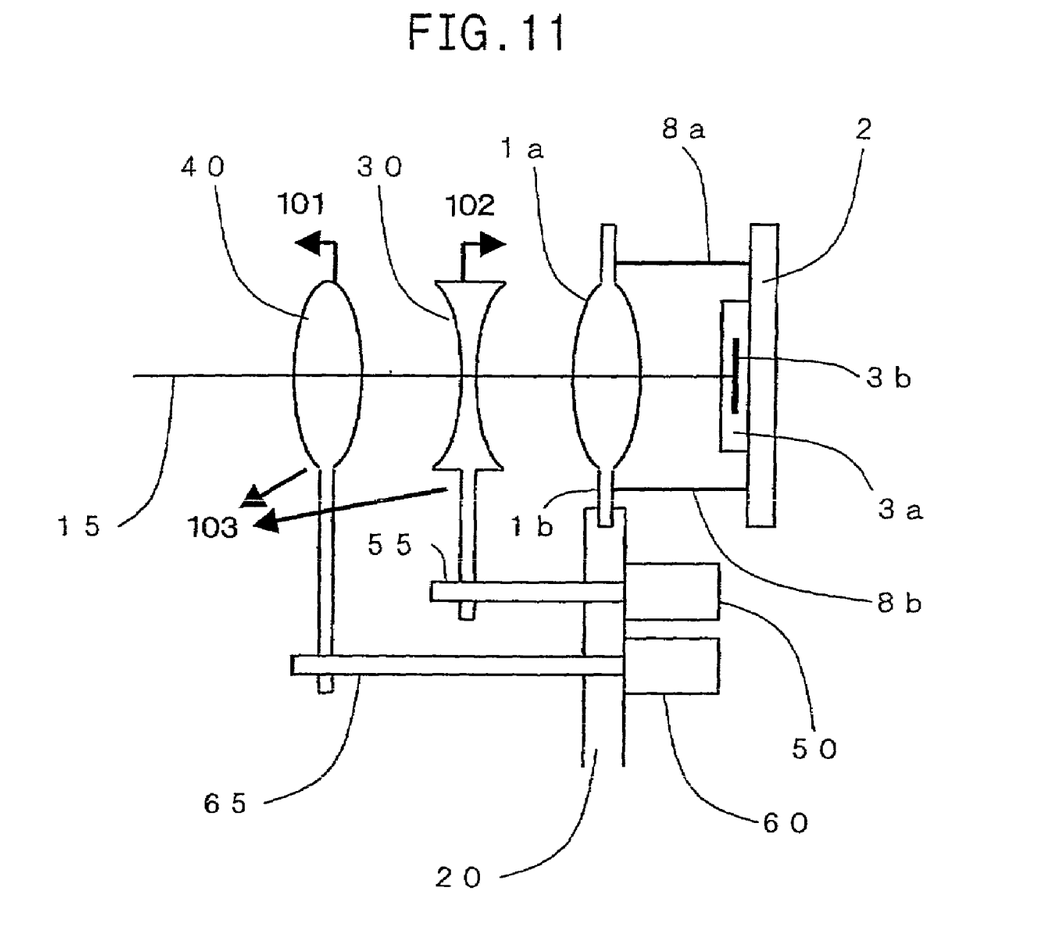
FIG. 11 presents an example of a photographing optical system utilizing the photographic lens and the image-capturing element unit achieved in an embodiment of the present invention.

FIG. 11 shows a photographing optical system achieved by providing a convex lens 40, a concave lens 30 and the photographic lens 1*a* (a convex lens) along a photographic optical axis 15, starting from the side where the subject is present. With the lens integrated member 1*b* secured to a retaining member 20 provided inside the image-capturing device, the photographic lens 1*a* becomes fixed relative to the optical axis and, as a result, the image-capturing element unit (the CCD package 3*a*, the CCD chip 3*b* and the board 2) is driven relative to the fixed photographic lens 1*a* along the direction perpendicular to the photographic optical axis 15 during the vibration-proofing operation. In this case, the lens integrated member 1*b* may be regarded to be fixed relative to the body 100 of the image-capturing device.

A shaft 65 (a feed screw set parallel to the optical axis 15) interlocks with a screw hole portion provided at the convex lens 40 and also links with a motor 60 secured to the retaining member 20. As the shaft 65 is caused to rotate by the motor 60, the convex lens 40 moves along the direction of the optical axis. In addition, a shaft 55 (a feed screw set parallel to the optical axis 15) interlocks with a screw hole portion provided at the concave lens 30 and also links with a motor 50 secured to the retaining member 20. As the shaft 55 is caused to rotate by the motor 50, the concave lens 30 moves along the optical axis.

Focusing is achieved by driving the convex lens 40 along the optical axis (see 101) with the motor 60 and the shaft 65 in the structure illustrated in FIG. 11. Focusing may be achieved by driving the concave lens 30 along the optical axis (see 102) with the motor 50 and the shaft 55 instead. In addition, zooming is achieved by driving the concave lens 30 and the convex lens 40 together (see 103) so as to change the distance between them along the optical axis.

Figure 12:
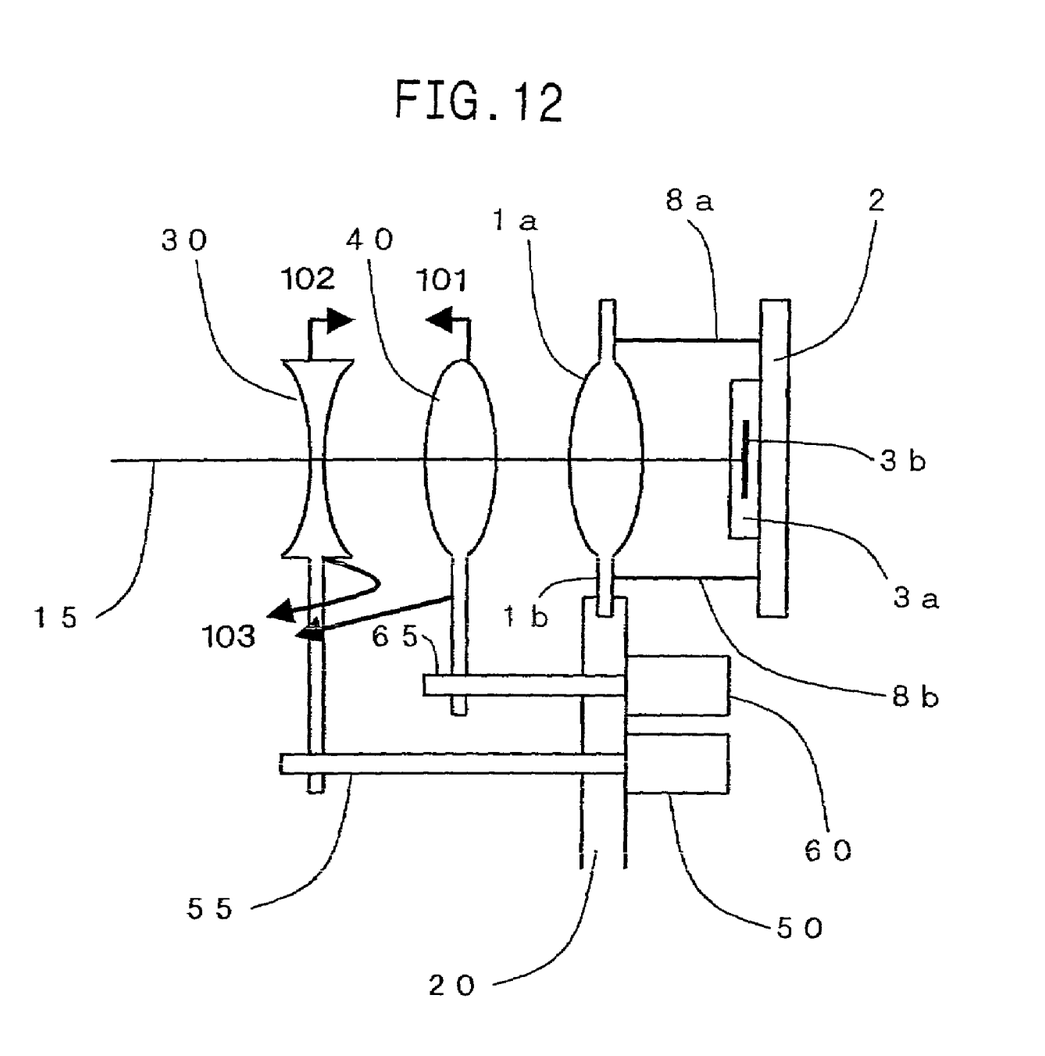
FIG. 12 presents another example of a photographing optical system utilizing the photographic lens and the image-capturing element unit achieved in an embodiment of the present invention.

FIG. 12 shows an example in which the positional relationship between the convex lens 40 and the concave lens 30 in FIG. 11 is reversed. The photographing optical system is constituted by providing the concave lens 30, the convex lens 40 and the photographic lens 1*a* (a convex lens), starting on the side where the subject is present, along the photographic optical axis 15, and other structural features are identical to those in FIG. 11.

Focusing is achieved by driving the convex lens 40 along the optical axis (see 101) with the motor 60 and the shaft 65 in the structure illustrated in FIG. 12. Focusing may be achieved by driving the concave lens 30 along the optical axis (see 102) with the motor 50 and the shaft 55 instead. In addition, zooming is achieved by driving the concave lens 30 and the convex lens 40 together (see 103) so as to change the distance between them along the optical axis.

Figure 13:
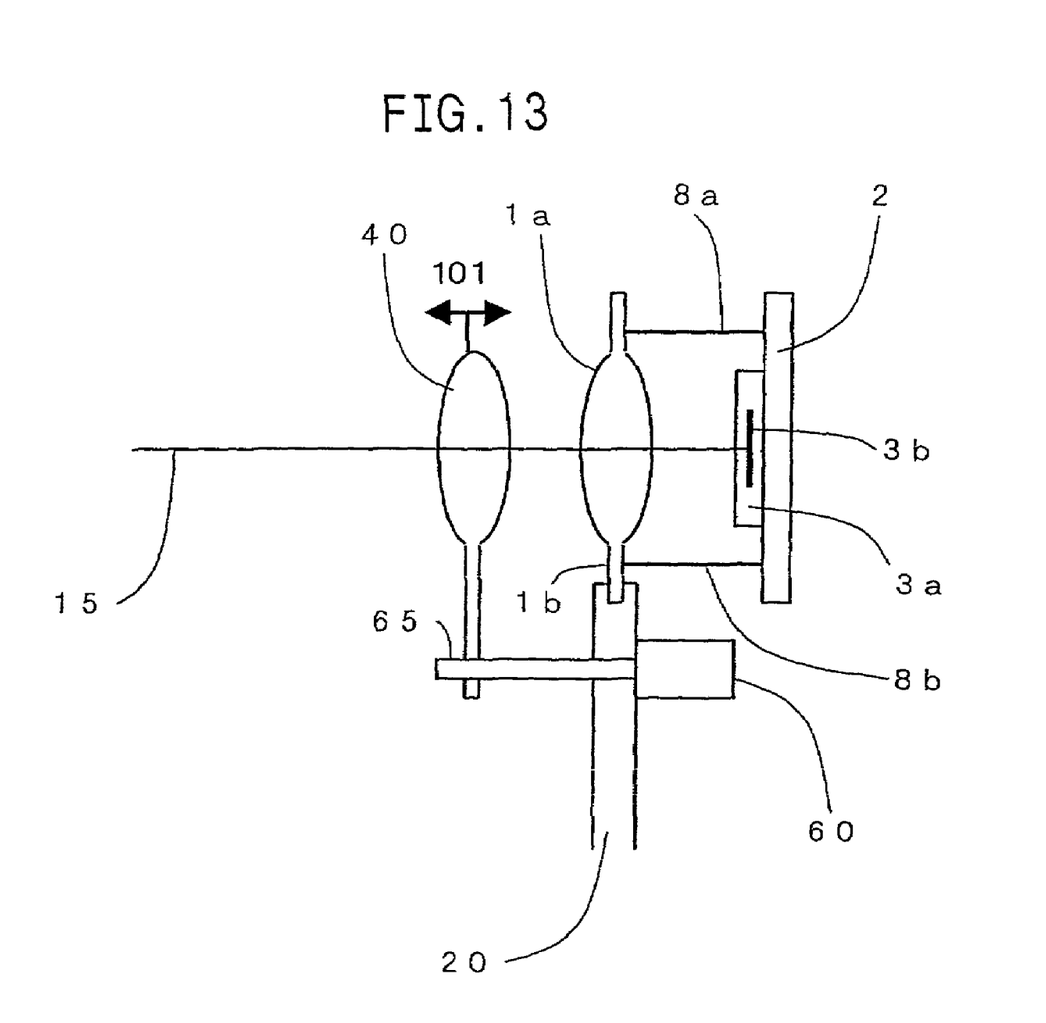
FIG. 13 presents yet another example of a photographing optical system utilizing the photographic lens and the image-capturing element unit achieved in an embodiment of the present invention.

FIG. 13 presents an example in which the concave lens 30 and also the motor 50 and the shaft 55 provided to drive the concave lens 30 in the structure shown in FIG. 11 are eliminated, and the photographing optical system which is suitable for close-up photographing is constituted by providing the convex lens 40 and the photographic lens 1*a* (a convex lens) along the photographic optical axis 15 starting on the side where the subject is present, with other structural features are identical to those in FIG. 11.

Focusing is achieved by driving the convex lens 40 along the optical axis (see 101) with the motor 60 and the shaft 65 in the structure illustrated in FIG. 13.

Figure 14:
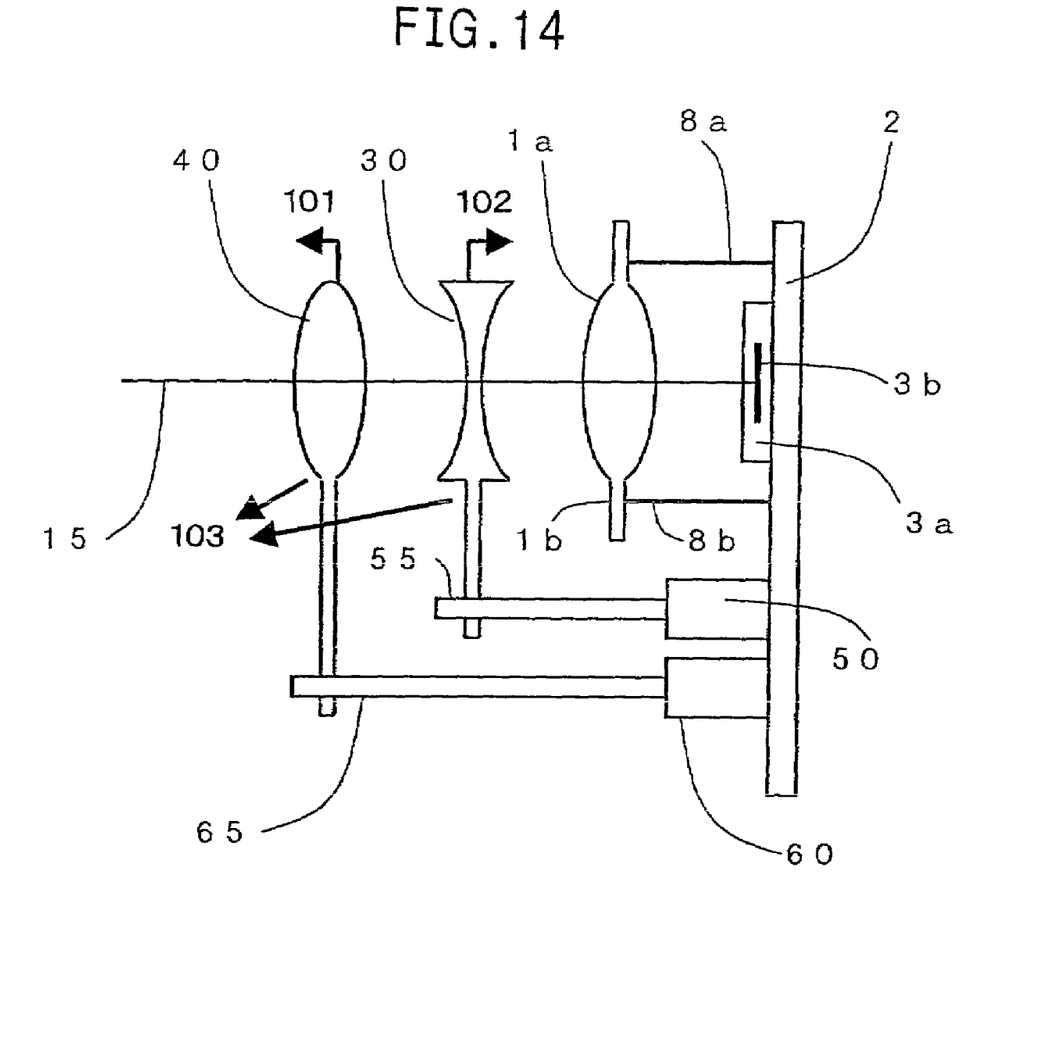
FIG. 14 presents yet another example of a photographing optical system utilizing the photographic lens and the image-capturing element unit achieved in an embodiment of the present invention.

In the structural example presented in FIG. 14, which differs from the structure shown in FIG. 11 in the position at which the unit achieved by linking the photographic lens 1*a* and the image-capturing element unit (the CCD package 3*a*, the CCD chip 3*b* and the board 2) via the wires 8*a*–8*d* is connected to the main body of the image-capturing device, the board 2 mounted with the CCD package 3*a* is secured to the main body of the image-capturing device so as to drive the photographic lens 1*a* relative to the fixed image-capturing element unit (the CCD package 3*a*, the CCD chip 3*b* and the board 2) along the direction perpendicular to the photographic optical axis 15 during a vibration-proofing operation. The board 2 may be regarded as being secured relative to the main body, i.e., the body 100, of the image-capturing device in this structure. In addition, the motor 50 and the motor 60 are secured to the board 2 which, in turn, is secured relative to the main body of the image-capturing device. Other structural features are identical to those in FIG. 11.

Focusing is achieved by driving the convex lens 40 along the optical axis (see 101) with the motor 60 and the shaft 65 in the structure illustrated in FIG. 14. Focusing may be achieved by driving the concave lens 30 along the optical axis (see 102) with the motor 50 and the shaft 55 instead. In addition, zooming is achieved by driving the concave lens 30 and the convex lens 40 together (see 103) so as to change the distance between them along the optical axis.

Figure 15:
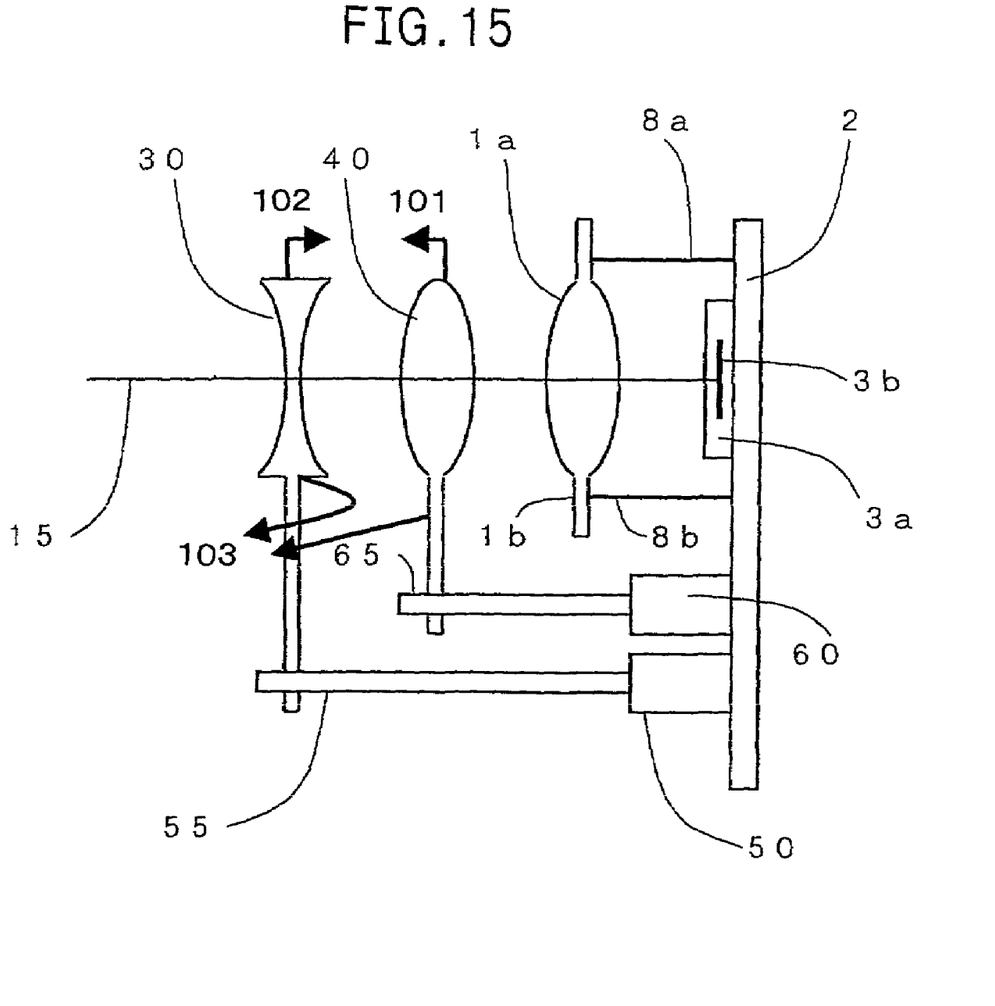
FIG. 15 presents yet another example of a photographing optical system utilizing the photographic lens and the image-capturing element unit achieved in an embodiment of the present invention.

FIG. 15 shows an example in which the positional relationship between the convex lens 40 and the concave lens 30 in FIG. 14 is reversed. The photographing optical system is constituted by providing the concave lens 30, the convex lens 40 and the photographic lens 1*a* (a convex lens), starting on the side where the subject is present, along the photographic optical axis 15, and other structural features are identical to those in FIG. 11.

Focusing is achieved by driving the convex lens 40 along the optical axis (see 101) with the motor 60 and the shaft 65 in the structure illustrated in FIG. 15. Focusing may be achieved by driving the concave lens 30 along the optical axis (see 102) with the motor 50 and the shaft 55 instead. In addition, zooming is achieved by driving the concave lens 30 and the convex lens 40 together (see 103) so as to change the distance between them along the optical axis.

Figure 16:
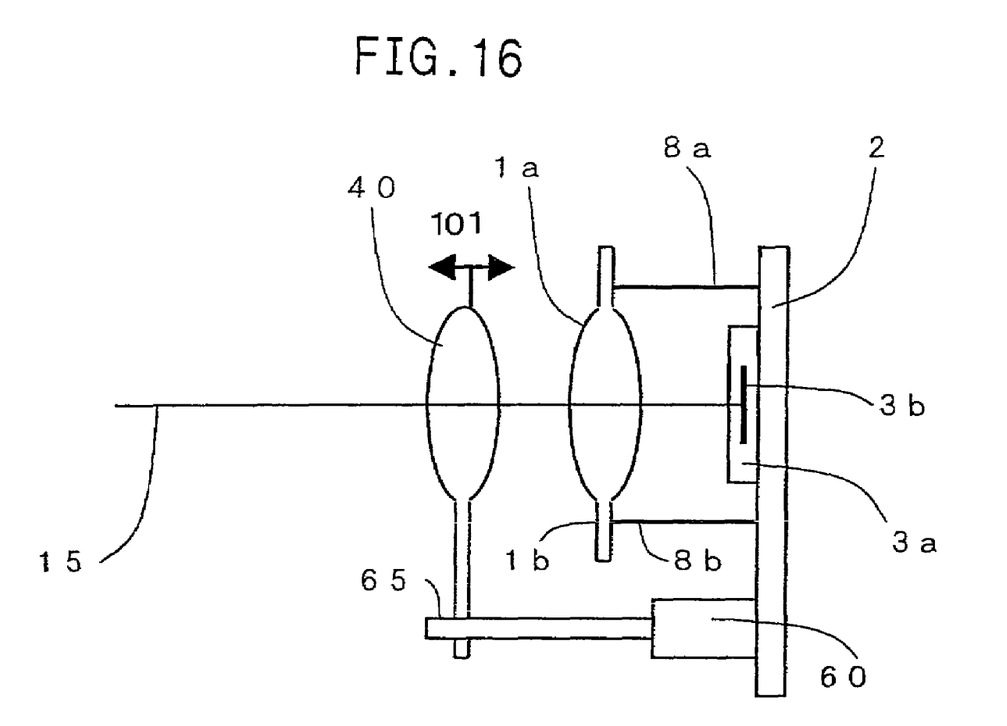
FIG. 16 presents yet another example of a photographing optical system utilizing the photographic lens and the image-capturing element unit achieved in an embodiment of the present invention.

FIG. 16 presents an example in which the concave lens 30, the motor 50 and the shaft 55 provided to drive the concave lens 30 in the structure shown in FIG. 14 are eliminated, and the photographing optical system which is suitable for close-up photographing is constituted by providing the convex lens 40 and the photographic lens 1*a* (a convex lens) along the photographic optical axis 15 starting on the side where the subject is present. Other structural features are identical to those in FIG. 14.

Focusing is achieved by driving the convex lens 40 along the optical axis (see 101) with the motor 60 and the shaft 65 in the structure illustrated in FIG. 16.

The present invention is not limited to the embodiments explained above and it allows for numerous variations and modifications.

While the photographic lens is constituted of a single lens in the first–fourth embodiments, the photographic lens may include a plurality of lenses. In such a case, the entire lens assembly constituted of a plurality of lenses may be shift-driven for blur correction, or only the lens closest to the image-capturing element may undergo shift-drive for blur correction.

In addition, while no other optical member is present between the photographic lens and the image-capturing element in the first–fourth embodiments, an optical member such as a low pass filter member or a light-blocking member for cutting off the high-frequency components in the subject image may be provided in the space between the image-capturing element and the photographic lens, instead. While an explanation has been given in reference to the first–fourth embodiments on an example in which the board 2 is a printed circuit board, the board 2 does not need to be a printed circuit board and may be a dedicated board that can be positioned with further accuracy relative to the image-capturing element package. In such a case, by forming the board and the photographic lens member of resin and mounting the metal wires through insert molding, a further improvement can be achieved with regard to the positional accuracy of the image-capturing element and the photographic lens member along the optical axis. Furthermore, the board, the photographic lens member and the wires may be formed as an integrated unit by using resin.

Moreover, while the elastic members are constituted of metal wire or resin in the first–fourth embodiments, the present invention is not restricted to these particulars and the elastic members may be constituted of springs or plate springs, instead. Alternatively, they may be constituted of a synthetic rubber. In other words, any of various types of elastic materials can be used as long as they impart a restorative force to regain their original state after being flexed to a specific extent.

The present invention may be adopted in various types of image-capturing devices including electronic still cameras, video cameras, compact cameras for image intake provided in notebook type personal computers and image-capturing cameras internally provided in mobile telephones.

What is claimed is:

1. An image-capturing device comprising:
   an image-capturing element that converts light to an electrical signal;
   a photographic lens member that condenses subject light at the image-capturing element;
   a board on which the image-capturing element is mounted;
   a vibration detection sensor secured to the board that detects an extent of vibration of the image-capturing device;
   a position detector having a first member mounted on the photographic lens member and a second member mounted on the board to detect a relative position of the photographic lens member and the board;
   an elastic member having one end thereof secured to the photographic lens member and another end thereof secured to the board; and
   a vibration-proofing unit that moves the board and the photographic lens member relative to each other along a direction substantially perpendicular to an optical axis of the photographic lens member in conformance to outputs from the vibration detection sensor and the position detector.

2. An image-capturing device according to claim 1, wherein:
   the vibration-proofing unit moves the board and the photographic lens member relative to each other along a direction substantially perpendicular to the optical axis of the photographic lens member by imparting an electromagnetic force.

3. An image-capturing device according to claim 2, wherein:
   the board is an electric circuit board; and
   the elastic member achieves electrical conductivity and at least part of the drive device and the electric circuit board are electrically connected via the elastic member.

4. An image-capturing device according to claim 3, wherein:
   the vibration-proofing unit comprises an electromagnet that moves as part of the photographic lens member and a permanent magnet secured to the board.

5. An image-capturing device according to claim 3, wherein:
   the vibration-proofing unit comprises an electromagnet that moves as part of the photographic lens member and an electromagnet secured to the board.

6. An image-capturing device according to claim 2, wherein:
   the vibration-proofing unit comprises a permanent magnet that moves as part of the photographic lens member and an electromagnet secured to the board.

7. An image-capturing device according to claim 1, wherein:
   the elastic member is formed in a narrow, elongated rod shape and achieves elasticity along a direction perpendicular to a longitudinal direction thereof.

8. An image-capturing device according to claim 7, wherein:
   the elastic member is a metal wire.

9. An image-capturing device according to claim 1, wherein:
   the photographic lens member includes a photographic lens portion and a holding portion for holding the photographic lens.

10. An image-capturing device according to claim 9, wherein:
    the photographic lens and the holding portion are formed as an integrated unit through resin molding.

11. An image-capturing device according to claim 1, wherein:
    the photographic lens member and the elastic member are formed as an integrated unit through resin molding.

12. An image-capturing device according to claim 1, wherein:
    the elastic member regulates the distance between the image-capturing element and the photographic lens member.

13. An image-capturing device according to claim 1, wherein:
    the first member is a gradation chart and the second member is a photo-reflector.

14. An image-capturing device according to claim 1, wherein:

the first member is a slit and a LED and the second member is a PSD.

15. An image-capturing device according to claim 1, wherein:
a distance between the image-capturing element and the vibration detection sensor is greater in length than a distance between the image-capturing element and the second member.

16. An image-capturing device according to claim 1, wherein:
the board is fixed relative to a main body of the image-capturing device.

17. A camera comprising:
an image-capturing element that converts light to an electrical signal;
a photographic lens member that condenses subject light at the image-capturing element;
a board on which the image-capturing element is mounted;
a vibration detection sensor secured to the board that detects an extent of vibration of the camera;
a position detector having a first member mounted on the photographic lens member and a second member mounted on the board to detect a relative position of the photographic lens member and the board;
an elastic member having one end thereof secured to the photographic lens member and another end thereof secured to the board; and
a vibration-proofing unit that moves the board and the photographic lens member relative to each other along a direction substantially perpendicular to an optical axis of the photographic lens member in conformance to outputs from the vibration detection sensor and the position detector.

18. A camera according to claim 17, wherein:
the vibration-proofing unit moves the board and the photographic lens member relative to each other along a direction substantially perpendicular to the optical axis of the photographic lens member by imparting an electromagnetic force.

19. A camera according to claim 17, wherein:
the first member is a gradation chart and the second member is a photo-reflector.

20. A camera according to claim 17, wherein:
the first member is a slit and a LED and the second member is a PSD.

21. An image-capturing method that condenses a subject light on an image-capturing element by a photographic lens member, comprising:
mounting the image-capturing element on a board;
securing the photographic lens member to an elastic member, one end of the elastic member being secured to the photographic lens member and another end of the elastic member being secured to the board;
detecting a relative position of the photographic lens member and the board by a position detector, the position detector having a first member mounted on the photographic lens member and a second member mounted on the board;
detecting an extent of vibration of the board with a vibration detection sensor, the vibration detection sensor secured to the board; and
moving the board and the photographic lens member relative to each other along a direction substantially perpendicular to an optical axis of the photographic lens member in conformance to the detected relative position and the detected extent of vibration.

22. The method according to claim 21, wherein:
the first member is a gradation chart and the second member is a photo-reflector.

23. The method according to claim 21, wherein:
the first member is a slit and a LED and the second member is a PSD.

24. The method according to claim 21, wherein:
the elastic member is a metal wire.

25. The method according to claim 21, wherein:
moving the board and the photographic lens member by imparting an electromagnetic force.

26. The method according to claim 21, wherein:
a distance between the image-capturing element and the vibration detection sensor is greater in length than a distance between the image-capturing element and the second member.

* * * * *